United States Patent
Altman et al.

(10) Patent No.: US 12,140,327 B2
(45) Date of Patent: Nov. 12, 2024

(54) TOP-MOUNTED AIR CONDITIONER USED IN ENCLOSURE COOLING

(71) Applicant: Ice Qube, Inc., Greensburg, PA (US)

(72) Inventors: Ridge Altman, Greensburg, PA (US); Jeffrey S. Palmer, Greensburg, PA (US); Jamshaid Ullah, Shenzshen (CN)

(73) Assignee: Ice Qube, Inc., Greensburg, PA (US)

( * ) Notice: Subject to any disclaimer, the term of this patent is extended or adjusted under 35 U.S.C. 154(b) by 127 days.

(21) Appl. No.: 17/572,352

(22) Filed: Jan. 10, 2022

(65) Prior Publication Data

US 2022/0244689 A1 Aug. 4, 2022

Related U.S. Application Data

(60) Provisional application No. 63/215,117, filed on Jun. 25, 2021, provisional application No. 63/135,420, filed on Jan. 8, 2021.

(51) Int. Cl.

| | |
|---|---|
| *F24F 1/02* | (2019.01) |
| *F24F 1/022* | (2019.01) |
| *F24F 1/03* | (2019.01) |
| *F24F 11/30* | (2018.01) |
| *F24F 11/56* | (2018.01) |
| *F24F 11/63* | (2018.01) |
| *F24F 13/22* | (2006.01) |

(Continued)

(52) U.S. Cl.
CPC ............... *F24F 1/022* (2013.01); *F24F 1/02* (2013.01); *F24F 1/03* (2019.02); *F24F 11/30* (2018.01); *F24F 11/56* (2018.01); *F24F 11/63* (2018.01); *F24F 13/222* (2013.01); *G07D 11/10* (2019.01); *G07F 9/105* (2013.01); *G07F 19/205* (2013.01); *F24F 2221/52* (2013.01); *F25B 2600/07* (2013.01); *G05B 19/042* (2013.01); *G05B 2219/2614* (2013.01)

(58) Field of Classification Search
CPC ...... F24F 1/02; F24F 1/022; F24F 1/03; F24F 11/30; F24F 11/56; F24F 11/63; F24F 13/222; F24F 2221/52; F25B 2600/07
See application file for complete search history.

(56) References Cited

U.S. PATENT DOCUMENTS

2020/0141597 A1* 5/2020 Amundson ............... F24F 11/80

FOREIGN PATENT DOCUMENTS

| CN | 207912433 U | 9/2018 |
|---|---|---|
| KR | 20030065313 A | 8/2003 |

(Continued)

OTHER PUBLICATIONS

KR 10-0200292 (English translation) (Year: 1999).*

(Continued)

*Primary Examiner* — Jonathan Bradford
(74) *Attorney, Agent, or Firm* — Gabriel & Co; Andrew M. Gabriel

(57) ABSTRACT

An air conditioner includes: an outer housing that contains therein one or more of a condenser, a compressor, coils, a fan, an enclosure air intake, and an enclosure air return; one or more rainwater drains configured to transmit rainwater that enters the housing through the outer housing to ambient; and one or more condenser drains configured to transmit condensation from within the outer housing to an exterior location via one or more conduits.

13 Claims, 3 Drawing Sheets

(51) Int. Cl.
  *G07D 11/10*   (2019.01)
  *G07F 9/10*    (2006.01)
  *G07F 19/00*   (2006.01)
  *G05B 19/042*  (2006.01)

(56) References Cited

FOREIGN PATENT DOCUMENTS

KR   101470317 B1   12/2014
RU     2716917 C1    3/2020

OTHER PUBLICATIONS

WO 2020/003664 (English translation) (Year: 2020).*
Sarychev, K, Written Opinion of The International Searching Authority, PCT/US2022/011845, Jan. 10, 2022, 4 pages.

* cited by examiner

TOP-MOUNTED AIR CONDITIONER USED IN ENCLOSURE COOLING

CROSS-REFERENCE TO RELATED APPLICATIONS

This application claims priority to U.S. provisional application No. 63/135,420, filed 8, Jan. 2021, and 63/215,117, filed 25, Jun. 2021; the contents of each application are incorporated by reference in their entirety.

BACKGROUND

Since items in an enclosure (such as electronics used in communication, computation, displaying data, dispensing mechanisms or like equipment and/or items in the enclosure, e.g., to be dispensed) often generate heat within an enclosure, such as a vending or dispensing machine, various cooling equipment such as air conditioners, heat exchangers, in-line compressed air coolers and filtered fan systems may be used to maintain required operating temperatures within the enclosure.

BRIEF SUMMARY

The subject matter disclosed herein relates to enclosure cooling systems and related techniques. Some of the subject matter disclosed herein relates to a small cooling system that is mounted to an enclosure and used for cooling items within the enclosure, such as heat generating components or other contents within the enclosure.

An embodiment provides an air conditioner that utilizes a small housing sized to accommodate fitting to a small enclosure. An embodiment provides cooling to the enclosure and its contents while occupying minimal space. An embodiment may be mounted on the outside of an enclosure to be cooled, e.g., on top of the enclosure. One or more cutouts on the enclosure interface(s) with one or more intake(s) and return(s) on the air conditioning unit, facilitating circulation or provision of cooling to the enclosure interior.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "in an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

The description now turns to the figure(s), which illustrate certain example embodiments. The dimensions and other numerical information provided herein, including in the figures, are provided only by way of example and are not limiting unless specifically included in a claim. In the figure(s), certain example dimensions are provided in millimeters.

Figure 1A:
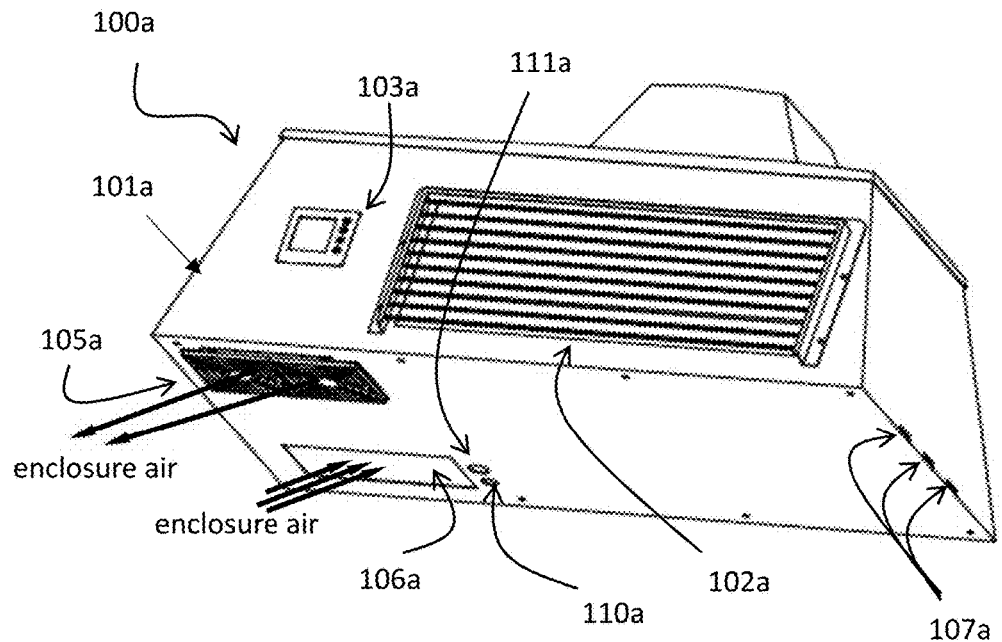
FIG. 1A-FIG. 1B illustrate views of an air conditioner according to an example embodiment.
Figure 1B:
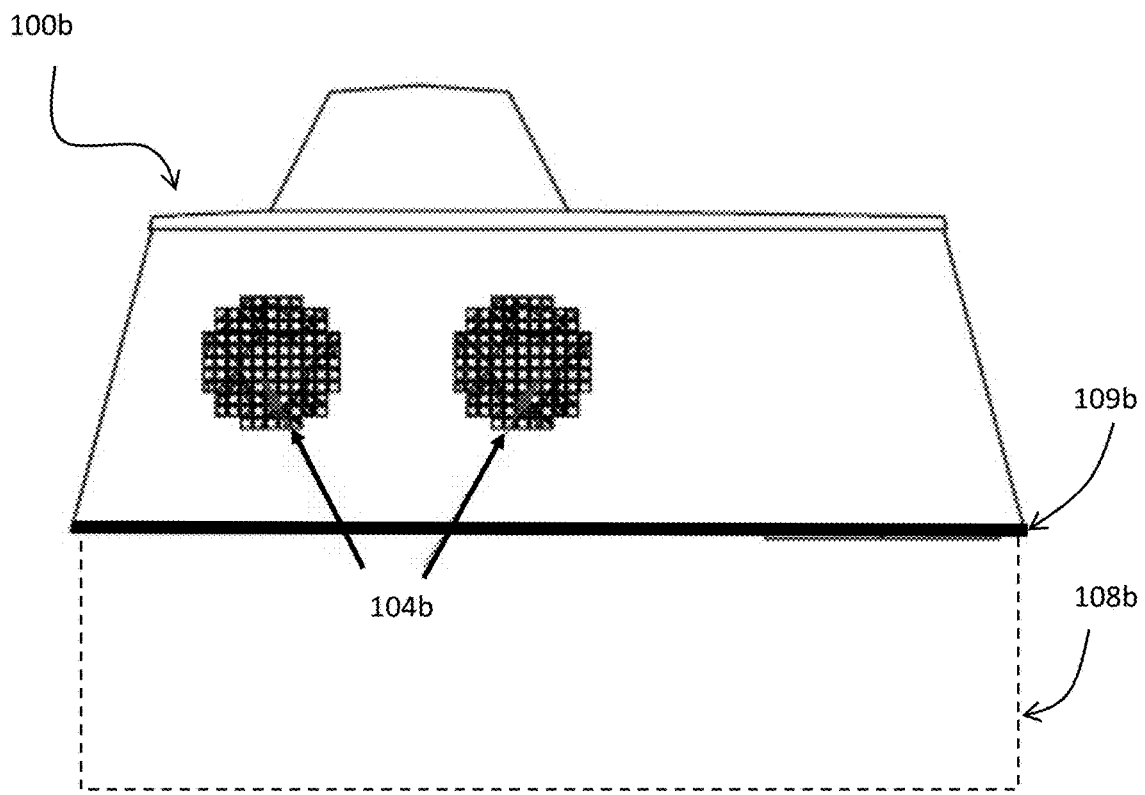

Referring to FIG. 1A-B, embodiments are illustrated in which various views of an example an air conditioner 100a, 100b unit are provided. The views of FIG. 1A-B are provided showing examples of a small sized unit housing 101a having dimensions of about 9.45" (240 mm) by 23.62" (600 mm) by 11.02" (280 mm). For example, the air conditioner unit 100a, 100b may be 600 mm long, 280 mm wide, and 240 mm tall.

The example air conditioning unit 100a, 100b includes cooling components such as a compressor and evaporator needed to condition enclosure air, as well as enclosure air intake 106a and enclosure air return 105a, for taking in enclosure air and returning conditioned air to the enclosure 108b.

An embodiment includes a seal on the underside of the unit 100a, 100b ("sealing strip") at the interface of the unit 100a, 100b and the enclosure 108b, e.g., to seal or adhere the unit 100a, 100b to the enclosure 108b. In one example embodiment, a seal or sealing strip 109b comprises silicone for example as applied to the periphery of the underside of the unit 100b, with or without internal sealing strip(s), to form a waterproof or watertight bond between the bottom of the unit 100b and an enclosure 108b, e.g., enclosure 108b of a dispensing unit comprising heat generating electronics, such as an automated teller machine (ATM). In an embodiment, once silicone sealant is applied to the bottom, e.g., during a field installation, the air conditioning unit 100b is then mounted onto the enclosure 108b, applying pressure to the silicone sealing strip 109b and bonding it to the enclosure 108b, e.g., by bolting it using an air conditioner cover or housing 101a and braces to an enclosure 108b.

In an embodiment, e.g., as for example shown in FIG. 1A-B, a heat exchanger core may be included. In an embodiment, silicone may be applied to subcomponents of the heat exchanger, e.g., silicone sealant similar to or the same as that used for the sealant strip(s) 109b may be applied to the fins of the heat exchanger. In one example, a technician may apply silicone to each of the fins of the heat exchanger and apply pressure or pressing to seal the fins inside the silicone sealant.

Illustrated in FIG. 1A are examples of water drain configurations 107a, e.g., as shown in FIG. 1A, a rainwater drain 107a comprising one or more or a series of holes or rectangular slat(s) formed in the housing 101a. In the example of FIG. 1A, the water drain 107a is configured to deliver rainwater that enters the air conditioning unit 100a on the condenser side (see e.g., FIG. 2) to the exterior of the air conditioning unit 100a and the enclosure 108b, i.e., ensuring that water does not enter the enclosure 108b.

Figure 2:
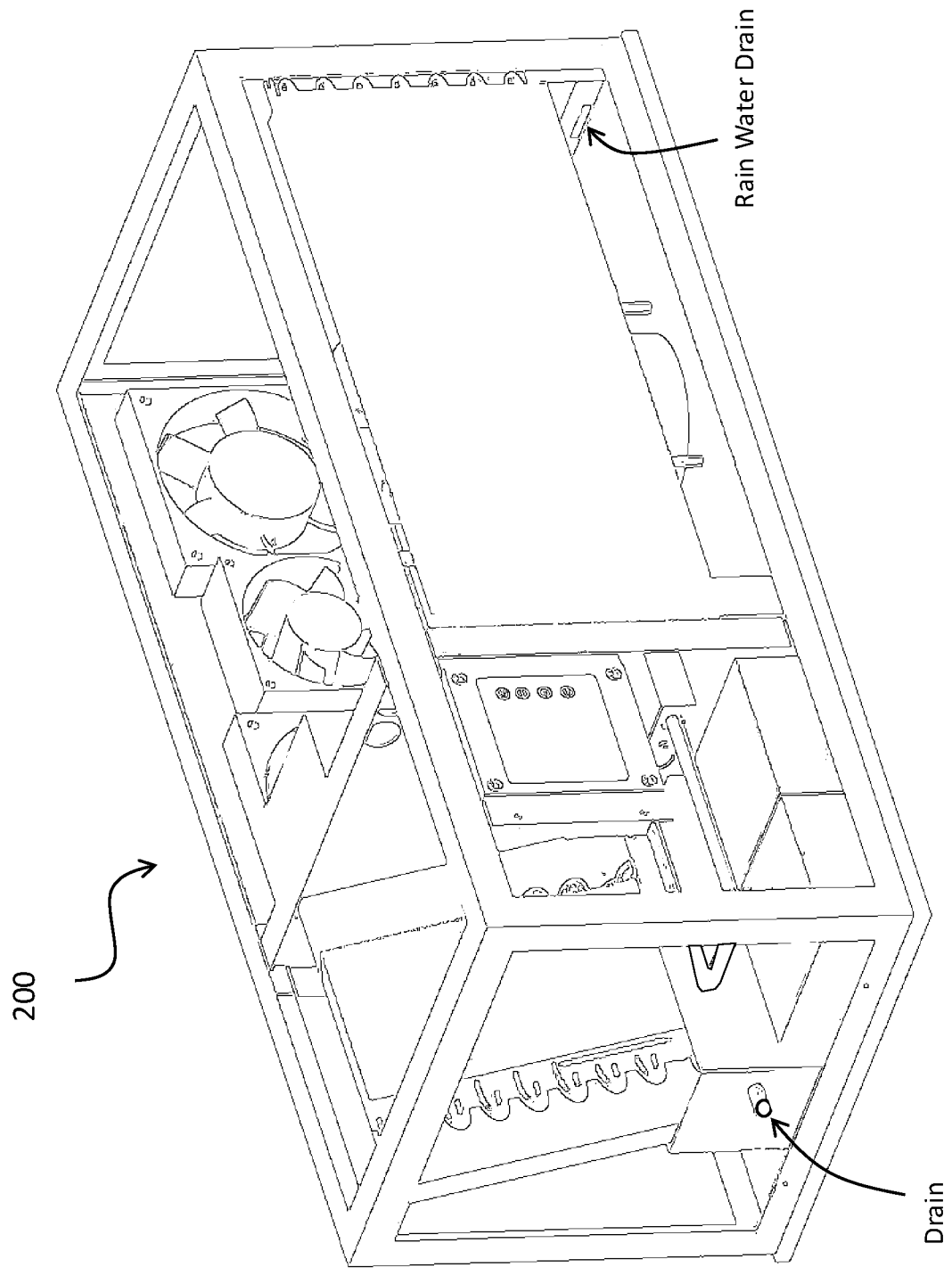
FIG. 2 illustrates an example of air conditioning internal elements according to an embodiment.

An embodiment may include one or more drains 107a. In the example views of FIG. 1A and FIG. 2, one or more drains 107a to external from the evaporator side of the air conditioning unit 100a may be provided. As illustrated in FIG. 1A and FIG. 2, the drain 107a conducts water from the underside of the evaporator coils, e.g., in a condensation drain pan in the evaporator side, to the exterior of the unit 100a. Additionally or alternatively, an embodiment may employ a drain for condensation through the underside of the unit, as shown in FIG. 1A at 110a. This permits water, e.g., formed in the evaporator compartment, to exit the exterior of the unit 100a to the underside at 110a, e.g., into the enclosure 108b to be cooled. Thereafter the water may be drained per the enclosure 108b configuration, e.g., to the ambient or external environment via a water conduit or drain.

An embodiment therefore includes drain feature(s) that prevent water, such as generated or produced via condensation around or about the air conditioning unit 100a or subcomponents during operation as well as water from the external environment such as rain, from entering the enclosure 108b in an uncontrolled manner.

FIG. 1A-1B illustrates views of an air conditioner 100a, 110b according to an example embodiment in which the exterior housing or shell 101a, 101b has been removed. The examples of FIG. 1A-1B illustrate an embodiment that is a small top mounted air conditioning unit 100a, 100b. The unit 100a, 100b includes enclosure side intake 106a and return 105a on the bottom margin along with power and ethernet connections or ports (which may be a different or additional port, such as Modbus), as illustrated at 111a. A series of drains 107a may be included on the side(s) of the unit 100a, 100b. An ambient air intake 102a and controller 103a are supplied to a side of the unit 100a, for example opposite the ambient exhaust 104b in the example of FIG. 1B. As with certain other embodiments, similar sealing strip(s) 109b and/or drains 107a may be included in or with the unit 100a, 100b. As illustrated in FIG. 1A-B, the outer shell or housing 101a, 101b of the unit 100a, 100b is angular and forms a trapezoid shape generally, with a small projection sitting atop the unit.

An embodiment is a small top mount air conditioning unit 100a, 100b. The small size is achieved through utilizing rotary-style compressors and a unique configuration and design of the condenser coil, evaporator coil, fans, and rotary compressor, as generally illustrated in the example of FIG. 2, which shows an example arrangement and organization of internal components. This unique layout of components in the air conditioning unit 200 allows for optimal performance and the elimination of condensation leaking into the application it is mounted on. For example, as shown in the FIG. 2, in an embodiment a layout includes use of coil sizes (the example of the figures are of the same scale), coil angles (angular orientations in FIG. 2 are referenced to the example dimensions of FIG. 1A-B), compressor placement relative to the fans and coils (relative spacing information is derivable from the scale relationships of FIGS. 1A-B and FIG. 2 and the dimensions of FIG. 1A-B), which allow for increased airflow while minimizing the overall size of the unit.

An embodiment provides a drainage system 107a that utilizes an angled coil and catch pan for the collection of water coming off the coil, as may be further appreciated from the view provided in FIG. 2. This water, e.g., from condensation, is then directed from inside the air conditioning unit 200 to the outside of the air conditioning unit 200 where it can be managed as seen fit.

As shown in FIG. 1A-B, an embodiment includes a digital controller 103a to communicate with the fan(s) internal to the unit 100a, the compressor, and other internal components. The digital controller 103a is used in conjunction with network connectivity, e.g., ethernet, for remote access and alerts.

Figure 3:
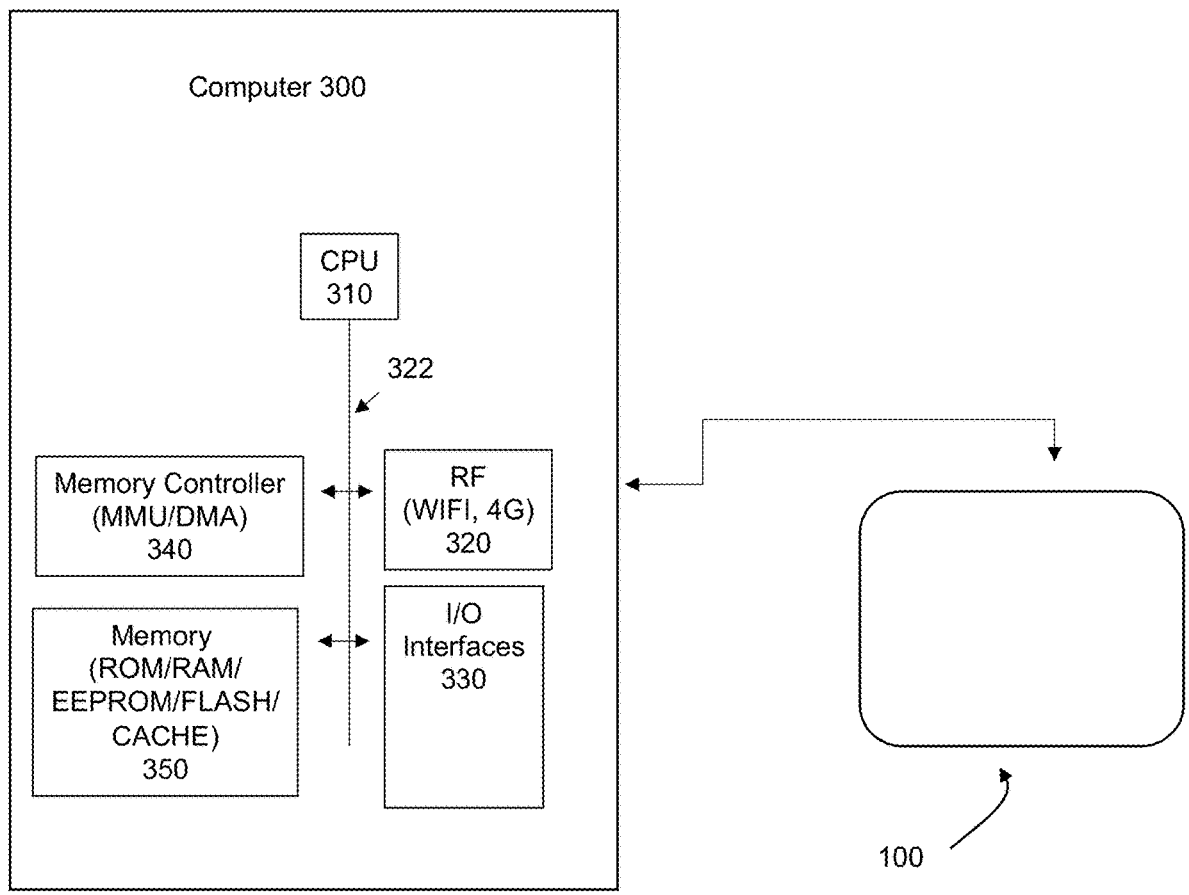
FIG. 3 illustrates an example system.

In an embodiment, wireless communication is facilitated between the controller 103a and one or more remote devices, e.g., computer 300 of FIG. 3. For example, when near the air conditioning unit 100a and controller 103a, an operator may connect the controller 103a wirelessly using a short range or near field wireless communication connection, a BLUETOOTH wireless communication connection, etc. In an embodiment, a remote device used to control the controller 103a and the air conditioning unit 100a may take the form of a tablet computer or a smart phone such as illustrated at 300 in FIG. 3. In an embodiment, the remote device may have a mobile application installed that permits communication with the controller 103a via one or more appropriate wireless connections, such as via a personal area network such as BLUETOOTH communication or via a wide area network such as the Internet.

In an embodiment, the controller 103a may be programmed to control the air conditioning unit 100a via wireless communication, e.g., via a mobile application and graphical user interfaces (GUIs), wired communication, e.g., ethernet, or via manual input, e.g., using a series of dip switches. For example, in an embodiment, the dip switches may be reached manually by an operator through an access panel to set up the desired temperature set point(s), e.g., if a smart device is not available or preferred for setting or configuring the air conditioning unit 100a wirelessly. The dip switches may be connected to or interface with a printed circuit board (PCB) of the controller 103a to allow manual configuration of set point(s).

Using a mobile application, the air conditioner 100a can be accessed with a security code or data, e.g., a four digit security code, and all parameters, including setpoint(s), can be adjusted via the GUI interfaces. If two or more air conditioning units 100a are applied to an implementation, e.g., on or in connection with a single enclosure to be cooled, the set points or other parameters can be configured in combination, e.g., using the mobile application. For example, the setpoint of one air conditioning unit 100a may be set to begin operation (cooling) at a higher temperature if the other, e.g., primary, air conditioner cannot adequately cool the enclosure. The two controllers 103a of the air conditioning units 100a, configured by the user, communicate with one another in a programmed fashion to accomplish such a lead-lag setup. In an embodiment, one or more template GUIs may be provided for the user in the mobile application, e.g., to automate or semi-automate configuring such a lead-lag or other set up arrangement. For example, the units 100a may be associated with one another via proximity to the device running the mobile application, e.g., device 300 of FIG. 3, and a user may select a template or preconfigured settings to associate the controller(s) 103a of the units 100a. In this fashion, a user may not need to enter any data other than confirmation of the predetermined configuration(s) of the template or to adjust a reduced dataset, e.g., enter or adjust set point(s) for the unit(s), indicate a leading or primary unit 100a, indicating a unit as a redundant unit, etc.

In an embodiment, current and/or vibration sensor(s) may be used in the air conditioning unit 100a and report data to the controller 103a and/or a remote device 300, e.g., running the mobile application. In an embodiment, a current sensor may be utilized to detect current of a component, e.g., a compressor, and compare the current to a predetermined threshold or range. Using such data, the controller 103a or other programmable process, e.g., implemented at a remote device, may determine that a component is out of range, below or above a threshold value, etc. Such a determination may lead to an automated action, e.g., an indication, an alert, an alarm, an automatic configuration adjustment (e.g., change in set point(s)), etc. For example, a given component may be expected to draw a certain amount or range or current. If a current sensor reports to the controller 103a that the current is below this value or another value, e.g., a lower threshold, the controller may produce an alert or alarm that appears on a remote device 300, e.g., the device that is running the mobile application.

In an embodiment, one or more vibration sensors may also report sensed data to the controller(s) 103a, e.g., report vibration data from the fans. In an embodiment, the vibration data may be used to detect a pattern, signature, or amount of vibration from a component such as a fan to indicate the component is nearing its end of life. In an embodiment, the vibration sensor data is compared to a known set of vibration data to produce an estimated remaining life, which can be sent as an indication, alert or alarm. In an embodiment, different estimates of remaining life may result in different automated actions, e.g., providing an indication for a first remaining life estimate, thereafter, providing an alert for a reduced remaining life estimate, and providing an alarm and escalation message, e.g., email, text, push notification, etc., when end of life estimate is imminent, or the component has failed.

Referring to FIG. 3, an example device that may be used in implementing one or more embodiments includes a control device in the form of a computing device (computer) 300, for example included in an embodiment, component thereof such as a control panel, and/or another system (e.g., a phone, tablet, laptop or desktop computer).

The computer 300 may execute program instructions or code configured to store and process data and perform other functionality of the embodiments, e.g., operate an air conditioning unit 100 or 100a or subcomponents thereof to cool an enclosure using set point(s) temperature(s), generate alarms related to temperature(s), intrusions, etc. Components of computer 300 may include, but are not limited to, a processing unit 310, which may take a variety of forms such as a central processing unit (CPU), a graphics processing unit (GPU), a programmable circuit or other programmable hardware, a combination of the foregoing, etc., a system memory controller 340 and memory 350, and a system bus 322 that couples various system components including the system memory 350 to the processing unit 310. It is noted that in certain implementations, computer 300 may take a reduced or simplified form, such as a microcontrol unit implemented in a control panel of an air conditioner, where certain of the components of computer 300 are omitted or combined.

The computer 300 may include or have access to a variety of non-transitory computer readable media. The system memory 350 may include non-transitory computer readable storage media in the form of volatile and/or nonvolatile memory devices such as read only memory (ROM) and/or random-access memory (RAM). By way of example, and not limitation, system memory 350 may also include an operating system, application programs, other program modules, and program data. For example, system memory 350 may include application programs such as variable speed control software and/or air conditioner operational software. Data may be transmitted by wired or wireless communication, e.g., to or from first device to another device, e.g., communication between a remote device or system such as computer 300 and air conditioner 360, which itself may include a device like the computer 300 in a reduced form, such as in the form of a control panel.

A user can interface with (for example, enter commands and information) the computer 300 through input devices such as a touch screen, keypad, etc. A monitor or other type of display screen or device may also be connected to the system bus 322 via an interface, such as an interface 330. The computer 300 may operate in a networked or distributed environment using logical connections to one or more other remote computers or databases. The logical connections may include a network, such local area network (LAN) or a wide area network (WAN) but may also include other networks/buses.

It should be noted that various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state drive, or any suitable combination of the foregoing. In the context of this document "non-transitory" media includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN) or the connection may be made through other devices (for example, through the Internet using an Internet Service Provider), through wireless connections, or through a hard wire connection, such as over a USB or another power and data connection.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are illustrated in the figures, and a particular ordering or organization of elements or steps has been illustrated, these are non-limiting examples. In certain contexts, two or more elements or steps may be combined into an equivalent element or step, an element or step may be split into two or more equivalent elements or steps, or certain elements or steps may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting, and that various other changes and modifications may be affected by one skilled in the art without departing from the scope or spirit of the disclosure.

What is claimed is:

1. An air conditioner, comprising:
   an outer housing comprising two or more sides comprising an ambient side intake and return and a bottom side that defines an enclosure side intake and return, wherein the outer housing contains therein one or more of a condenser, a compressor, coils, and a fan;
   one or more rainwater drains disposed in at least one of the two or more sides of the outer housing beneath the one or more of the condenser, the compressor, the coils, and the fan;
   the one or more rainwater drains being disposed proximate to an interface between the at least one of the two or more sides of the outer housing and the bottom side of the outer housing including the enclosure side intake and return, and being configured to transmit rainwater that enters the outer housing through the outer housing to ambient; and
   one or more condensation drains disposed in the outer housing proximate to the enclosure side intake and return, the one or more condenser drains being configured to transmit condensation from within the outer housing to an exterior location via one or more conduits.

2. The air conditioner of claim 1, wherein the outer housing is configured to mount onto the top of a dispensing enclosure.

3. The air conditioner of claim 2, wherein the dispensing enclosure is an automated teller machine.

4. The air conditioner of claim 3, wherein the outer housing is substantially rectangular at an interface with the automated teller machine.

5. The air conditioner of claim 1, comprising one or more sealing strips.

6. The air conditioner of claim 4, comprising one or more sealing strips, wherein the one or more sealing strips are disposed on a side of the outer housing at the interface with the automated teller machine.

7. The air conditioner of claim 1, comprising silicone applied to one or more internal components of the air conditioner.

8. The air conditioner of claim 1, wherein two or more lateral sides of the outer housing are angled inward as each extends from the bottom side.

9. A system, comprising:
   an air conditioner as in claim 1; and
   a dispensing enclosure.

10. The system of claim 9, wherein the outer housing of the air conditioner is substantially rectangular at an interface with the dispensing enclosure.

11. The system of claim 9, comprising one or more processors operatively connected to a remote device.

12. The system of claim 11, wherein the air conditioner is configured to operate in response to an instruction from the remote device via use of the one or more processors.

13. The system of claim 12, wherein the instruction modifies one or more setpoints of the air conditioner.

\* \* \* \* \*